INVENTOR.
Rollo Marple.
BY
Harness, Dickey & Pierce
ATTORNEYS.

July 12, 1955    R. MARPLE    2,712,957
LATCH MECHANISM
Filed March 30, 1951    3 Sheets-Sheet 2

INVENTOR.
*Rollo Marple.*
BY
*Harness, Dickey & Pierce*
ATTORNEYS.

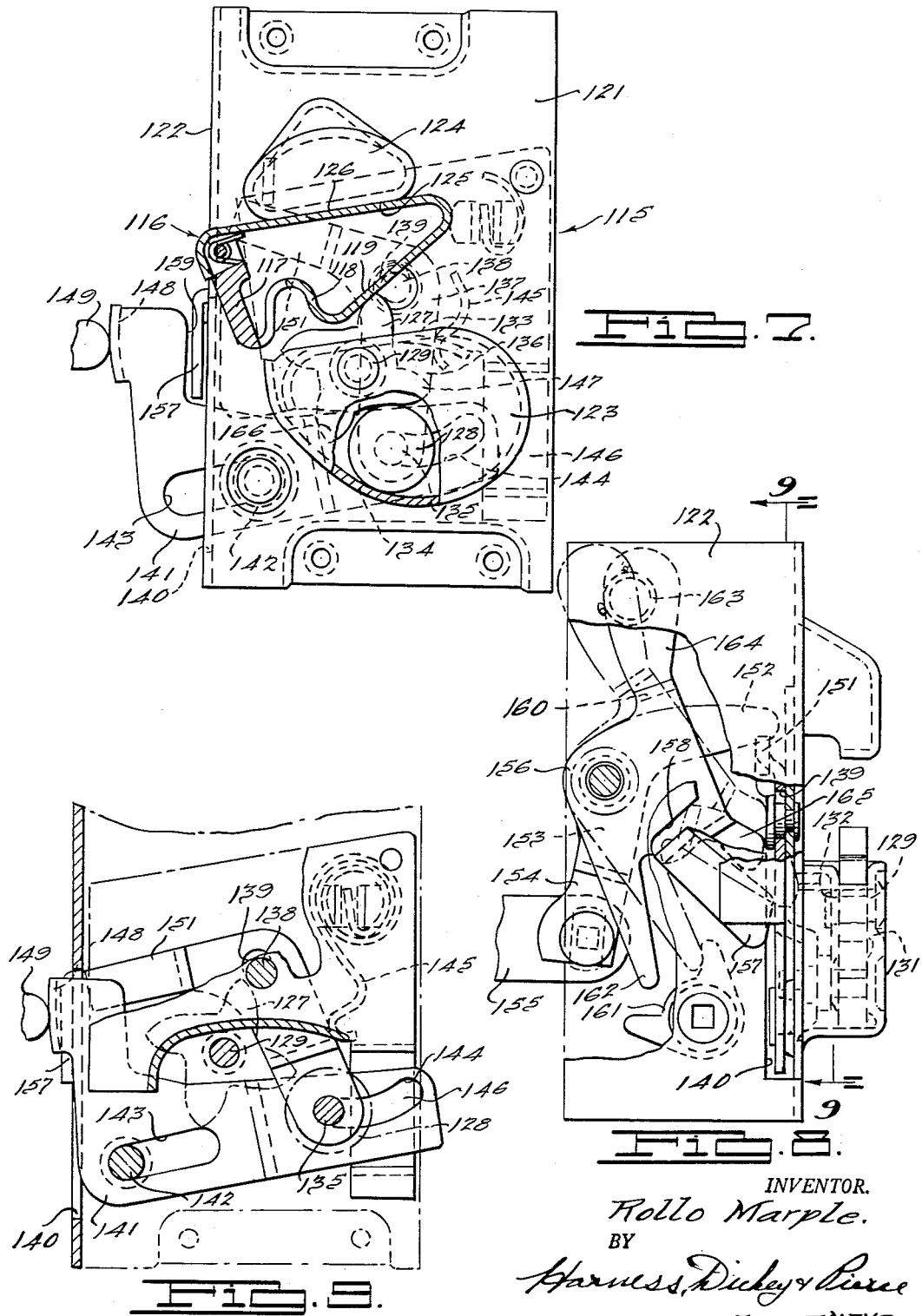

United States Patent Office 2,712,957
Patented July 12, 1955

2,712,957

LATCH MECHANISM

Rollo Marple, Jackson, Mich., assignor to Hancock Manufacturing Company, Jackson, Mich., a corporation of Michigan Application March 30, 1951, Serial No. 218,447

15 Claims. (Cl. 292—279)

This invention relates to door latching and locking mechanisms and more particularly to latches and locks adapted for use on the doors of automotive vehicles or in other installations where the door is subjected to jarring or vibrations.

It is an object of this invention to provide a door latch mechanism embodying a novel and improved take-up means for constantly urging the latch mechanism into a fully latched position, whereby any play between the door and jamb members will be immediately and continuously taken up. In particular, it is an object to provide an improved latch mechanism having cooperating bolt and keeper elements, one of said elements being movable, and means engageable with the movable element for continuously taking up any slack appearing between the bolt and keeper due to vibration or other causes.

It is a further object to provide a latch mechanism as described above, which utilizes the principle of a rotary element comprising either the bolt or keeper, and in which a continuous camming action is imparted to the rotary element in its latching direction after its engagement with the other element. More particularly, it is an object to provide a latch mechanism having a toothed rotary bolt or keeper, and in which a spring-urged roller is disposed between one tooth of said rotary element and a stationary inclined cam surface when the rotary element is in latching position, so that the roller continuously urges the rotary element in its latching direction.

It is another object to provide a latch mechanism of the above character, in which the necessity of a double set of teeth on the rotary element is eliminated, and which instead utilizes a rotor of relatively simple construction having but a single set of teeth. In particular, it is an object to provide such a latching mechanism whereby one tooth of the roller is engageable with its opposing latch element, and another tooth on the rotor is simultaneously engaged by a continually acting take-up means for urging the first tooth in its latching direction.

It is a further object, in one form of my invention, to provide a latch mechanism which includes a keeper of the rotary type and having take-up means of the above character, said keeper cooperating with a bolt which is held stationary upon engagement with the keeper in a door closing direction, but which is releasable by a door operator to allow retracting movement when the door is opened.

It is also an object, in another form of this invention, to provide a latch mechanism having a rotary bolt with take-up means of the above character, and cooperating with a stationary keeper, the take-up means for the rotary bolt being retractable by a manual door operator when the door is opened.

Other objects, features, and advantages of the present invention will become apparent from the subsequent description taken in conjunction with the accompanying drawings.

In the drawings:

Figure 7 is a front elevational view of a modified form of my invention which utilizes a rotary bolt and a stationary keeper, the view having parts broken away for clarity and showing the elements of the bolt and a portion of the keeper in cross-section.

Figure 8 is a side elevational view of the bolt shown in Fig. 7, with parts broken away for clarity and showing the locking elements; and Figure 9 is a fragmentary cross-sectional view taken along the line 9—9 of Fig. 8 and showing the bolt take-up and dogging means in its retracted position.

Figure 1:
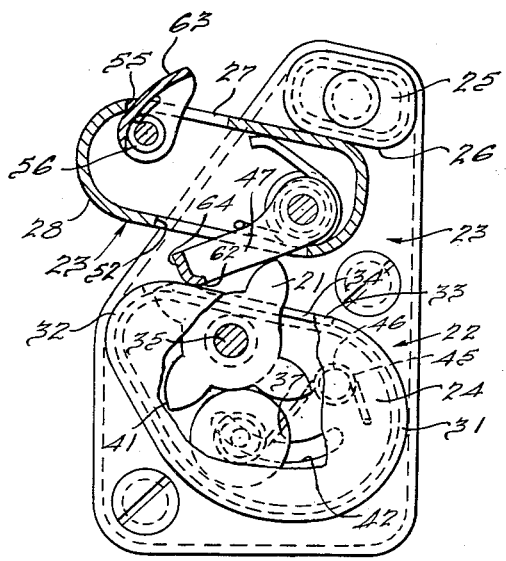
Figure 1 is an elevational view of the rotary keeper of one form of my invention, showing the novel take-up means and also showing portions of the cooperating bolt structure in cross-section.
Figure 2:
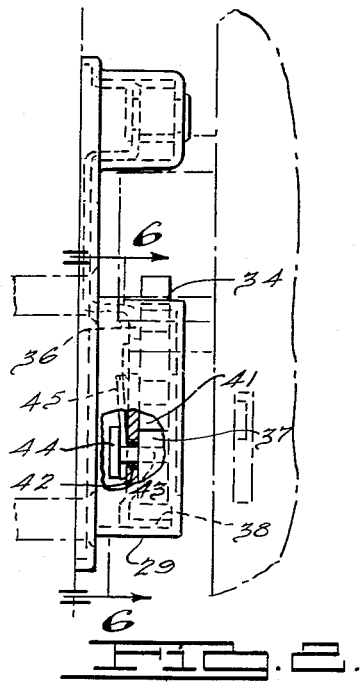
Figure 2 is a side elevational view of the keeper of Fig. 1, showing the bolt structure in dot-dash lines.

The principles of this invention are particularly adapted to be utilized in the door latches of automotive vehicles in which the doors are subject to jarring or vibration, although it will be understood that these principles are likewise applicable to other and similar installations. In particular, the invention is adapted for use in door latches which use a rotary or star-shaped element as either the keeper or the bolt, and the invention contemplates a dogging element for holding the rotor against retraction, the same dogging element also being used as a take-up element to continuously and progressively urge the rotor in its latching direction.

As exemplified in the embodiment of Figs. 1-6, the invention is embodied in a door latching mechanism of the type having a rotary keeper element 21 mounted on the door pillar (not shown) by a mounting plate 22, and a bolt mechanism generally indicated at 23 which is secured to the outer edge of the door (also not shown). The keeper mounting plate 22 comprises a flat base portion and a rotor housing 24 extending outwardly from one side of the base portion. The upper end of the keeper mounting plate is provided with a wedge element or abutment 25 extending in the same direction as the rotor housing and having an inclined lower surface 26 for cooperation with the upper inclined surface 27 of the bolt housing 28. The rotor housing 24 is of irregular shape and in particular has a curved lower wall 29 which, as will later appear, underlies the track or cam for the dogging and take-up means. Wall 29 is contiguous with a rounded rear wall 31 of relatively large curvature and a convex front wall 32 of relatively small curvature, and these walls in turn are connected by an inclined upper wall 33 substantially parallel to lower abutment surface 26, and which has a rectangular opening 34 for the teeth of rotor 21. The rotor which is shown for illustrative purposes as having four circumferentially disposed teeth, is pivotally mounted by a pin 35 within the rotor housing, the pin 35 being disposed a short distance below the inclined upper wall 33 and a relatively large distance above lower wall 29. Pin 35 is supported at one end by a deck plate 36 which extends in spaced parallel relation with keeper mounting plate 22, and at its opposite end by the rotor housing 24.

Figure 6:
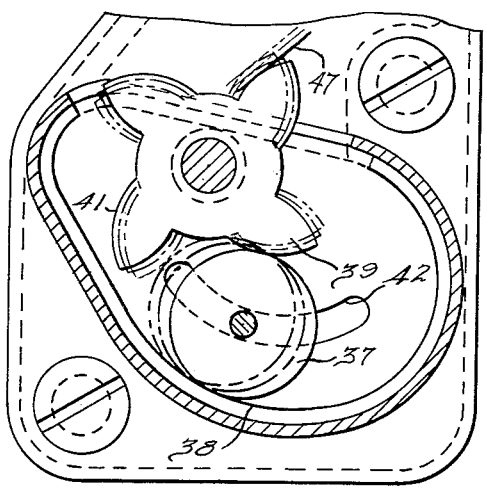
Figure 6 is a fragmentary elevational view taken in cross-section along the line 6—6 of Fig. 2, and showing the principle of operation of the take-up means which cooperates with the rotary element.

The combined dogging and take-up means for rotor 21 comprises a roller 37 which is disposed within the rotor housing 24 between the rotor and a lower track support. In particular, roller 37 is of such diameter that when resting upon a track 38, formed as a flange on deck 36 and conforming in contour with lower wall 29, the roller will engage a tooth 39 shown in Fig. 6, when urged toward the upwardly curving portion of the track. In other words, the proportions of the parts are such that when roller 37 is urged to the left as shown in Fig. 6, the upward slope of track 38 will cause upward movement of the roller, so that engagement with tooth 39 above the roller will occur before engagement with tooth 41 to its left. The track curvature is at progressively decreasing distances from the lower surface of tooth 39 going toward the left, and the rotor will thus be cammed in a continuous fashion in its latching direction as the roller moves along the track.

It is important to keep in mind that the roller 37 is free-floating in the sense that it has no fixed pivot, so that its movement will follow the curvature of track 38 without restriction. A curved guide slot 42 is preferably provided in deck plate 36 adjacent the roller, and a pin 43 extends from the roller through slot 42, the pin being provided with an enlarged head 44. The width of slot 42 however, is sufficient to allow a free lateral movement of roller 37 during operation of the device.

The means for urging roller 37 toward its dogging and take-up position preferably comprises a wire spring 45 having one end engageable with pin 43 and its opposite end secured to deck plate 36. The ends are urged apart by expandable loop 46 urging pin 43 toward the left end of curved slot 42 as shown in Figure 1. The engagement of spring 45 with pin 43 is such that it permits relative movement of the pin within slot 42. It will be seen therefore that the action of spring 45 will urge roller 37 into its leftward position in which one tooth of rotor 21 is extending upwardly from the rotor housing. As seen in Figure 1, when roller 37 is held in this position, it will not prevent counterclockwise rotation of rotor 21 such as occurs when the bolt 47 approaches the upwardly extending tooth from the right. In this case, the tooth 41 to the left of the roller 37 will move to the right, urging the roller to the right against the action of spring 45. This action will continue until tooth 41 passes the center line of the roller at which time the roller will engage the opposite side of the tooth and cam it counterclockwise as the roller moves to the left along inclined track 38.

The keeper described above is adapted to cooperate with bolt mechanism 23 which embodies a retractable bolt 47. The bolt elements are mounted on a bolt mounting plate which comprises a base section 48 and a flange section 49 which are in substantially normal relation, and a deck 50 secured in spaced parallel relation with base 48. The bolt 47 is pivotally mounted by a pin 51 within bolt housing 28 which extends outwardly from deck 50. The inclined lower surface of the bolt housing has an elongated slot 52 which allows the bolt 47 to extend in inclined position therethrough, the bolt being urged by a coil spring 53 into this position. The opposite end of the bolt housing 28 is provided with a pivoted safety bolt 54 which is urged upwardly through a slot 55 in the bolt housing by a coil spring 56 surrounding pivot pin 57. The safety element 54 has an extension 58 extending in the opposite direction from its bolt portion, and this extension is provided with oppositely disposed transverse lugs 59 and 61 respectively.

Figure 3:
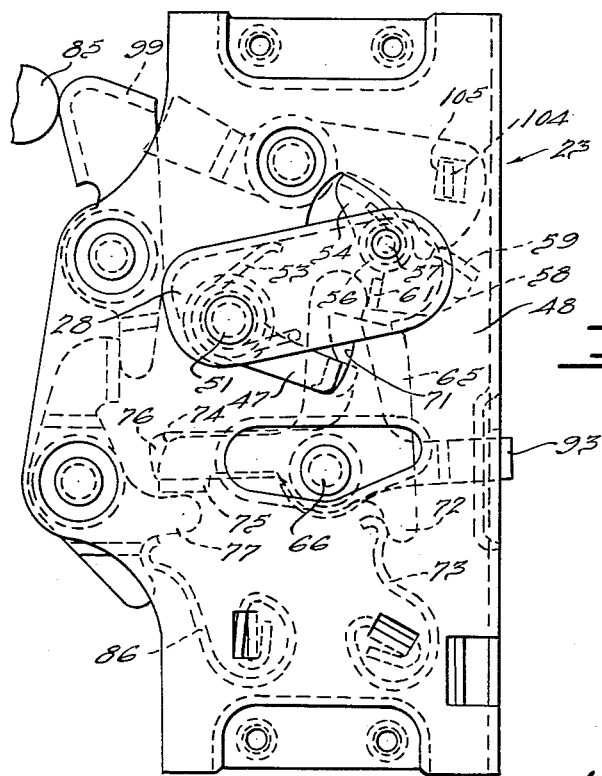
Figure 3 is an elevational view of a preferred bolt structure adapted to cooperate with the keeper shown in Figs. 1 and 2.

It will be noted from Figs. 1 and 3 that the bolt 47 and safety element 54 have engaging surfaces 62 and 63 respectively which are inclined in substantially parallel relation, but that the pivot points of these two elements are at opposite ends of their engaging surface, so that leftward movement of the bolt housing in Fig. 1 between the rotor housing 24 and the abutment 25 will cause safety member 63 to be retracted by the abutment, and will cause the rounded lower edge of bolt 47 to engage the inclined keeper surface 33 and ride therealong, engaging and rotating the upwardly extending tooth of rotor 21. This leftward movement will lift the entire bolt assembly (the bolt 47 being dogged against retraction by means later described), so that in its final latched position the upper surface 27 of the bolt housing will be wedged against lower surface 26 of the abutment 25. Upon release of the bolt dogging mechanism and rightward movement of the bolt housing in Fig. 1, bolt 47 will be cammed upwardly into retracted position by the dogged rotor 21, and as will be seen later, the simultaneous positive retraction of safety bolt 54 will allow the bolt housing to be withdrawn from between members 24 and 25.

Figure 4:
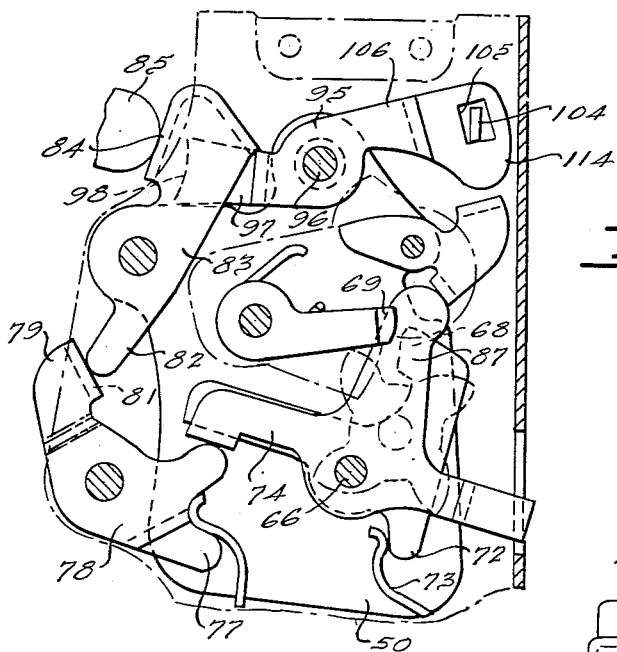
Figure 4 is a fragmentary cross-sectional view taken along the line 4—4 of Fig. 5 and showing the bolt in its retracted position, parts being omitted for clarity.

The dogging mechanism for preventing the retracting movement of bolt 47 comprises a dog 65 pivoted by pin 66 between the mounting plate base section 48 and deck 50. Dog 65 is provided with a toe 68 which is movable into obstructing relation above an extension 69 at the outer end of bolt 47. The latter extension is disposed behind base 48, the base being provided with an arcuate notch or recess 71 for allowing the bolt to extend therethrough and pivot between its dogged and retracted positions. The dog 65 is further provided with an extension 72 engageable by a spring 73 to urge the dog counterclockwise as shown in Figs. 3 and 4. The dog is operable by a retracting lever 74 also pivotally mounted on pin 66, and which has a laterally extending toe 75 engageable with an arm 76 on dog 65. Toe 75 is engageable by an arm 77 of a pivoted bell crank 78, adjacent the outer edge of the base, the opposite arm 79 of the bell crank 78 having a lateral toe 81 engageable by arm 82 of rollback member 83. The flanged upper end 84 of the rollback member is actuatable by a member 85 which may be, for example, an outside door operator. Bell crank 78 is constantly urged in a clockwise direction by spring 86, thus urging the outside door operator into inoperative position and holding arm 77 of the bell crank away from toe 75. Upon rightward movement of operator 85 as shown in Fig. 4, the clockwise rotation of rollback 83 and the subsequent counterclockwise rotation of bell crank 78 will cause retracting lever 74 to move clockwise, and the engagement of toe 75 with arm 76 will cause simultaneous clockwise movement of dog 65, retracting toe 68 from obstructing position above bolt extension 69, allowing the bolt to be rotated into retracted position by engagement with the rotor 21.

Means are also provided for positively retracting the safety member 54 simultaneously with the undogging of bolt 47 when the door is unlatched. This means preferably comprises an arm 87 on retracting lever 74 which is engageable with lug 61 on the extension 58 of safety member 54. As is best seen in Fig. 4, the clockwise undogging movement of member 74 will cause safety member 54 to be rotated counterclockwise and within the elongated slot 55 on the upper surface of the bolt housing, therefore allowing the bolt mechanism to pass the abutment 25. Upon release of the retracting lever, spring 56 will urge the safety member back into its projected position. It will be noted that the safety member is retractable independently of the retracting lever 74 when it strikes the abutment 25 during closing movement of the door, lug 61 momentarily leaving its engagement with arm 87 during this movement.

Figure 5:
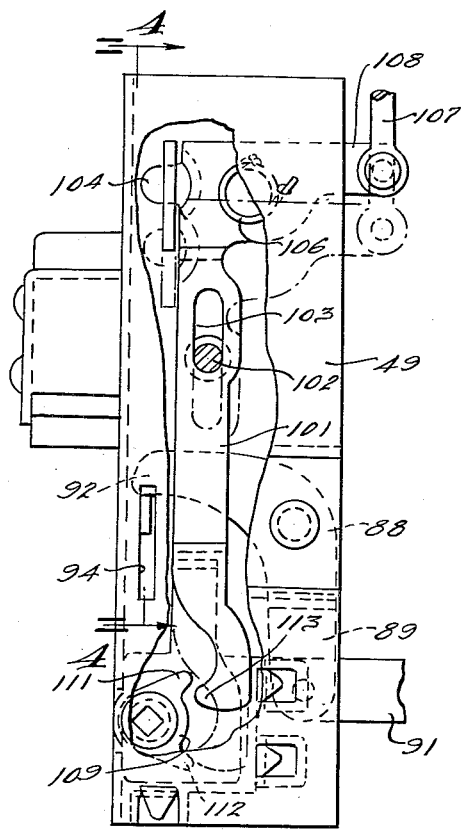
Figure 5 is a side elevational view of the bolt structure, with parts broken away for clarity and showing the locking elements.

The bolt mechanism is also provided with means for undogging the bolt from a remote operator such as an inside door handle. As shown best in Fig. 5, this means preferably comprises a bell crank 88 pivotally mounted on flange 49 and having one arm 89 extending downwardly for connection to a remote operator link 91. The upper arm 92 of the bell crank is disposed above the outer end of an arm 93 which is part of retracting lever 74, and which extends through a slot 94 in flange 49. Upon counterclockwise rotation of bell crank 88 as shown in Fig. 5, arm 93 will be depressed causing clockwise rotation of the retracting lever to undog the bolt and retract the safety member as described above.

Locking means are also provided for preventing unlatching of the bolt by the outside operator, and this means preferably comprises a locking member 95 pivotally mounted above the bolt housing by a pin 96. As is shown in Fig. 3, locking member 95 has a locking arm 97 with an outer locking surface 98 which, when the locking member is in its clockwise or locking position, is disposed in abutting relation with the upper portion 99 of the flange on the rollback member 83. This disposition of the locking member will thus prevent clockwise rotation of rollback 83 and therefore will not permit unlatching of the door by the outside operator 85. Locking member 95 is controlled by a slide 101 mounted for vertical reciprocating movement on flange 49 by a retaining pin 102 disposed within an elongated slot 103 on the slide. An ear 104 at the upper end of the slide projects through an opening 105 on control arm 106 of the locking member, so that the vertical position of the slide controls the rotational position of the locking member. An over-center spring 106 is provided for holding the slide in either its upper or lower position. The position of slide 101 may be controlled by a push rod 107 which extends upwardly to the inside garnish molding of the automotive vehicle and is connected to a lateral arm 108 of slide 101. The lock may also be controlled by a rotary membe 109 preferably operated by an outside key-actuator (not shown), and having spaced arms 111 ad 112 in lost-motion engagement with toe 113 at the lower end of the slide. When the locking member is in its counterclockwise or unlocking position as shown in Fig. 4, it will be out of obstructing relation with the movement of rollback 83. It will be observed that even when the locking member 95 is in its locking position as shown in Fig. 3, opening of the door by the inside remote operator is still not prevented, since there is no obstruction to the clockwise rotation of retracting lever 74.

Means are provided for automatically unlocking the outside rollback upon operation of the inside operator, or merely upon closing of the door. This means comprises lug 59 on the extension 58 of safety member 54, which faces a cam surface 114 at the outer end of locking member arm 106. As is best seen in Figs. 3 and 4, when the locking member is in its clockwise or locking position, counterclockwise rotation of safety member 54 will cause lug 59 to engage cam surface 114 thus camming the locking member into its counterclockwise or unlocking position. The counterclockwise rotation of safety member 54 may be caused by either of two events—namely, the actuation of the undogging member 74 by the inside operator, or the engagement of surface 63 of the safety member with abutment 25 during closing movement of the door. If either of these events occurs, the simultaneous movement of lug 59 will automatically move the locking member into unlocking position, thus preventing accidental or inadvertent locking of the door.

The cooperation of the various bolt and keeper elements described above may perhaps best be shown by a description of the series of events that take place during a complete closing and opening operation. Starting from an initial condition in which the door is open, the keeper mechanism 22 will be in a position approximately as shown in Fig. 1, but with the roller 37 in its full leftward position, engaging teeth 39 and 41, on both sides of it. The reason for this position is of course that the absence of bolt 47 means there is no force preventing rotor 21 from being urged counterclockwise as far as possible under the influence of the roller. Upon movement of the bolt housing 28 into the space between the rotor housing and the abutment 25, the surface 63 of safety member 54 will first engage the abutment and will be retracted thereby, the spring 56 projecting the safety member behind the abutment to hold the bolt mechanism from subsequent opening movement. If the locking member 95 is in its locking position, the retraction of the safety member will also cause unlocking movement of this member. As the bolt mechanism rides upwardly and inwardly on keeper surface 33, the end 64 of the bolt will engage the right side of the upwardly projecting tooth on bolt 21 as shown in Fig. 1. This will cause the rotor to turn counterclockwise, moving roller 37 downwardly and to the right along track 38 against the action of spring 45. When tooth 41 passes the center line of the roller, the spring 45 will cause the roller to be forced rapidly to the left along the track, engaging the underside of tooth 41, now tooth 39, as it moves. This action will be rather abrupt since there is initially no obstruction to the counterclockwise movement of the rotor. When the new upwardly projecting tooth reaches the underside of the bolt, the counterclockwise movement of the rotor will be temporarily stopped.

The subsequent cooperation of the roller and rotor is best seen in the progressive studies shown in Fig. 6. In this figure, three progressive positions of the roller, rotor and bolt are shown, the first position being shown in solid lines, the second in dot-dash lines, and the third position in double-dot-dash lines. It will be seen that in all positions the roller 37 will effectively dog the rotor against clockwise or unlatching movement, since the lines of force passing from the tooth 39 through the roller to the track are always at a sufficiently steep angle relative to the track so that the frictional forces will prevent the roller from slipping out of position. When the door is initially closed, the bolt 47 may not be moved leftward as far as possible, and its position will therefore prevent full entering movement of the roller 37 under the tooth 39, these parts remaining in their solid line position of Fig. 6. Upon subsequent vibration, jarring, or other forces tending to further move the bolt leftward and relieve the pressure on the roller, the roller will immediately be forced by spring 45 along the track, the contour of which will force the rotor counterclockwise into the dot-dash position. Still further vibration will again permit the roller to be forced along the track, until the bolt is finally held in its double-dot-dash position. It is important to observe that this take-up action is entirely continuous, and since the arrangement of parts is such that the roller does not normally engage tooth 41, the take-up will not be limited to a predetermined final bolt position.

When it is desired to open the door, actuation of either the outside operator 85 or the remote inside remote operator link 91 will cause undogging member 74 to rotate dog 65 into retracted position, so that when the bolt housing is manually forced rightward as shown in Fig. 1, the bolt 47 will ride over the projecting tooth on rotor 21 and will be forced downwardly into projected position again after it leaves the rotor. In this connection, it should be noted that the bolt will be immediately re-dogged when it returns to projected position. Should the vehicle operator release the door handle before bolt 47 leaves the rotor, the rounded end of bolt extension 69 will cam the toe 68 out of obstructing relation as it moves down, and the toe will ride over the extension and move into dogging position above it. Upon departure of the bolt from its contact with rotor 21 the latter will be left in the same position as previously described, ready for another closing operation. As described previously, operation of either door operator will also retract safety member 54, allowing the bolt housing to pass freely between the keeper housing 24 and the abutment 25.

Figs. 7 to 9 illustrate a modification of the invention which is generally similar in principle to the first embodiment, but which utilizes a rotary bolt mechanism generally indicated at 115 rather than a rotary keeper, the take-up principles being therefore embodied in the bolt rather than the keeper. The bolt cooperates with a keeper generally indicated at 116 which may be of a conventional stationary type, and which in the illustrated embodiment comprises a safety finger 117 pivotally mounted in the keeper housing, a striker surface 118 behind the safety finger, and an inclined main keeper surface 119 behind the striker surface. The bolt mechanism comprises a mounting plate having a base 121 and a flange 122 in substantially normal relation, with a bolt housing 123 and an inclined abutment 124 extending outwardly in spaced relation from the flange 121. The abutment 124 has an inclined lower surface 125 adapted to slide along the inclined upper surface 126 of the keeper when the door is closed, to thereby wedge the keeper between the abutment and rotary bolt 127, mounted near the upper end of the bolt housing. The rotor may be similar in design to that described in the keeper of the previous embodiment, and comprises a single set of teeth adapted to alternately project upwardly for engagement with the keeper, and to cooperate with the take-up roller 128. For this purpose the rotor is supported for rotational movement by a pivot pin 129 held between outer wall 131 of the bolt housing and a deck 132 extending in parallel relation with wall 131 within the upper portion of the bolt housing. The upper surface of the housing is provided with an elongated opening 133 which allows the rotor teeth to pass therethrough. The lower wall 134 of the housing is curved upwardly and to the left as shown in Fig. 7 to provide an inclined track similar in function to the track 38 of the previous embodiment.

In order to control the dogging and take-up action of roller 128, the latter is provided with a transversely extending pin 135 to which is connected one arm 136 of a retracting lever 137. This retracting lever is movably secured to base 121 by a pin 138 which is disposed within a slightly elongated slot 139 in the retracting lever. The positioning of slot 139 is such that movement of the retracting lever in the axial direction of arm 136 is permitted to a slight degree. Flange 122 is provided with an elongated slot 140 through which extends a rollback member 141. The rollback is slidably mounted directly behind base 121 by means of a pin and washer 142 disposed within an elongated slot 143 in the lower portion of the rollback. The rollback extends across the open inner side of bolt housing 123, and has an arcuate slot 144 within which extends the roller pin 135. A coil spring 145 is engageable with arm 136 of the retracting lever so as to urge the latter clockwise as shown in Fig. 7, thereby urging pin 135 against the left end of arcuate slot 144. This action in turn will urge the rollback 141 to the left, so that pin 142 will be disposed at the right end of slot 143. A guide 146 is provided on base 121 adjacent the opposite end of the rollback member to maintain its reciprocating movement.

It will be seen therefore that the spring 145 will normally urge roller 128 to the left end of track 134, and therefore into engagement with tooth 147 of the rotor 127. During this movement the upward curvature of track 134 will cause the roller to move upwardly against tooth 147 to urge the rotor into its counterclockwise or keeper-engaging position. This upward movement of the roller will not be restricted either by the retracting lever 137 or the rollback 141. The retracting lever will float with the roller because of its slightly elongated mounting hole 139, and rollback 141 will be allowed slight pivotal movement about pin 142 due to the play existing in guide 146. The roller will thus be allowed free take-up action in its engagement with the rotor 127, similar to the take-up action described with the relation to the previous embodiment. However, upon rightward movement of rollback 141 due to engagement with its flange 148 by outside door operator 149, the pin 135 and therefore the roller will be moved rightwardly and out of obstructing relation with the rotor, the length of slot 143 being such that sufficient retracting movement is allowed. Release of operator 149 will immediately allow spring 145 to return the roller to its dogging position. It will be noted that during operation of the roller by the rollback 141, the pin 135 will always remain at the left end of arcuate slot 144.

Means are provided for retracting roller 128 by a remote operator such as an inside door handle. For this purpose the retracting lever 137 is provided with an arm 151 which cooperates with one arm 152 of a bell crank 153 pivotally mounted on flange 122. The opposite arm 154 of the bell crank is adapted to be pivotally connected to a link 155 leading from a remote operator (not shown). Upon leftward movement of link 155 as seen in Fig. 8, the bell crank 153 will be rocked clockwise, rotating lever 137 counterclockwise as seen in Fig. 7. This movement will cause pin 135 and therefore roller 128 to move to the right end of arcuate slot 144 and out of obstructing relation with the rotor 127. It will be observed that during this action the roller will also be allowed relatively unrestricted movement as it follows track 134, due to the free-floating mounting of the lever 137 and the rollback 141.

Locking means are also provided in this modification for preventing movement of rollback 141. This locking means preferably comprises a locking lever 156 pivotally mounted on flange 122 in the same location as bell crank 153. A finger 157 on the locking lever extends through a slot 158 in flange 122 and is adapted to be moved in front of slot 140 so as to lie in obstructing relation with locking surface 159 of the rollback, thereby preventing undogging movement of the latter. This obstructing position of finger 157 occurs when the locking lever 156 is in its counterclockwise or locking position as shown in dot-dash lines in Fig. 8. However, when the locking lever is in its clockwise position shown by the full lines in Fig. 8, the finger 157 is lowered and moved leftward sufficiently to clear the undogging path of the rollback. The locking lever is preferably movable into its locking position by operation of the inside door handle in a direction opposite its normal door-opening direction, that is by rotation of bell crank 153 counterclockwise in Fig. 8. The inside door handle in this case could be one of the type which is biased to a neutral position and movable out of its neutral position in opposite directions. For this purpose, the locking lever is provided with a small bend 160 which extends laterally above the upper edge of arm 152 of the bell crank. It will be seen therefore that counterclockwise rotation of the bell crank will cause its upper edge to abut lip 160, moving the locking lever counterclockwise. The locking lever may also be moved into either of its positions by a forked lever 161 pivotally supported on flange 122 and adapted to have a lost-motion connection with an arm 162 on the locking lever. Forked member 161 may be actuated by a key mechanism (not shown), and the locking lever is held in either of its positions by an over-center spring 163 connected to an arm 164 on the locking lever. It will be noted that even when the locking lever is in its locking position, retraction of the roller 128 by the remote operator will still be permitted, since the rotational movement of retracting lever 137 will not be prevented.

Means are also provided for automatically unlocking the outside rollback either when the inside remote operator is actuated to unlatch the bolt, or when the door is closed. This means comprises a kick-off toe 165 on the locking lever disposed immediately under arm 151 of the retracting lever, as shown in Fig. 8. Upon counterclockwise rotational movement of the retracting lever as seen in Fig. 7, either due to actuation of the inside operator or by clockwise rotation of rotor 127 due to closing of the door, arm 151 will engage toe 165, thus rotating the locking lever into its unlocking position, in which position it will be held by over-center spring 163.

The cooperation of the various elements described in the embodiment of Figs. 7 to 9 may perhaps best be illustrated by a description of the sequence of events which tion of the retracting lever to undog the bolt and retract the safety member as described above.

Locking means are also provided for preventing unlatching of the bolt by the outside operator, and this means preferably comprises a locking member 95 pivotally mounted above the bolt housing by a pin 96. As is shown in Fig. 3, locking member 95 has a locking arm 97 with an outer locking surface 98 which, when the locking member is in its clockwise or locking position, is disposed in abutting relation with the upper portion 99 of the flange on the rollback member 83. This disposition of the locking member will thus prevent clockwise rotation of rollback 83 and therefore will not permit unlatching of the door by the outside operator 85. Locking member 95 is controlled by a slide 101 mounted for vertical reciprocating movement on flange 49 by a retaining pin 102 disposed within an elongated slot 103 on the slide. An ear 104 at the upper end of the slide projects through an opening 105 on control arm 106 of the locking member, so that the vertical position of the slide controls the rotational position of the locking member. An over-center spring 106 is provided for holding the slide in either its upper or lower position. The position of slide 101 may be controlled by a push rod 107 which extends upwardly to the inside garnish molding of the automotive vehicle and is connected to a lateral arm 108 of slide 101. The lock may also be controlled by a rotary membe 109 preferably operated by an outside key-actuator (not shown), and having spaced arms 111 ad 112 in lost-motion engagement with toe 113 at the lower end of the slide. When the locking member is in its counterclockwise or unlocking position as shown in Fig. 4, it will be out of obstructing relation with the movement of rollback 83. It will be observed that even when the locking member 95 is in its locking position as shown in Fig. 3, opening of the door by the inside remote operator is still not prevented, since there is no obstruction to the clockwise rotation of retracting lever 74.

Means are provided for automatically unlocking the outside rollback upon operation of the inside operator, or merely upon closing of the door. This means comprises lug 59 on the extension 58 of safety member 54, which faces a cam surface 114 at the outer end of locking member arm 106. As is best seen in Figs. 3 and 4, when the locking member is in its clockwise or locking position, counterclockwise rotation of safety member 54 will cause lug 59 to engage cam surface 114 thus camming the locking member into its counterclockwise or unlocking position. The counterclockwise rotation of safety member 54 may be caused by either of two events—namely, the actuation of the undogging member 74 by the inside operator, or the engagement of surface 63 of the safety member with abutment 25 during closing movement of the door. If either of these events occurs, the simultaneous movement of lug 59 will automatically move the locking member into unlocking position, thus preventing accidental or inadvertent locking of the door.

The cooperation of the various bolt and keeper elements described above may perhaps best be shown by a description of the series of events that take place during a complete closing and opening operation. Starting from an initial condition in which the door is open, the keeper mechanism 22 will be in a position approximately as shown in Fig. 1, but with the roller 37 in its full leftward position, engaging teeth 39 and 41, on both sides of it. The reason for this position is of course that the absence of bolt 47 means there is no force preventing rotor 21 from being urged counterclockwise as far as possible under the influence of the roller. Upon movement of the bolt housing 28 into the space between the rotor housing and the abutment 25, the surface 63 of safety member 54 will first engage the abutment and will be retracted thereby, the spring 56 projecting the safety member behind the abutment to hold the bolt mechanism from subsequent opening movement. If the locking member 95 is in its locking position, the retraction of the safety member will also cause unlocking movement of this member. As the bolt mechanism rides upwardly and inwardly on keeper surface 33, the end 54 of the bolt will engage the right side of the upwardly projecting tooth on bolt 21 as shown in Fig. 1. This will cause the rotor to turn counterclockwise, moving roller 37 downwardly and to the right along track 38 against the action of spring 45. When tooth 41 passes the center line of the roller, the spring 45 will cause the roller to be forced rapidly to the left along the track, engaging the underside of tooth 41, now tooth 39, as it moves. This action will be rather abrupt since there is initially no obstruction to the counterclockwise movement of the rotor. When the new upwardly projecting tooth reaches the underside of the bolt, the counterclockwise movement of the rotor will be temporarily stopped.

The subsequent cooperation of the roller and rotor is best seen in the progressive studies shown in Fig. 6. In this figure, three progressive positions of the roller, rotor and bolt are shown, the first position being shown in solid lines, the second in dot-dash lines, and the third position in double-dot-dash lines. It will be seen that in all positions the roller 37 will effectively dog the rotor against clockwise or unlatching movement, since the lines of force passing from the tooth 39 through the roller to the track are always at a sufficiently steep angle relative to the track so that the frictional forces will prevent the roller from slipping out of position. When the door is initially closed, the bolt 47 may not be moved leftward as far as possible, and its position will therefore prevent full entering movement of the roller 37 under the tooth 39, these parts remaining in their solid line position of Fig. 6. Upon subsequent vibration, jarring, or other forces tending to further move the bolt leftward and relieve the pressure on the roller, the roller will immediately be forced by spring 45 along the track, the contour of which will force the rotor counterclockwise into the dot-dash position. Still further vibration will again permit the roller to be forced along the track, until the bolt is finally held in its double-dot-dash position. It is important to observe that this take-up action is entirely continuous, and since the arrangement of parts is such that the roller does not normally engage tooth 41, the take-up will not be limited to a predetermined final bolt position.

When it is desired to open the door, actuation of either the outside operator 85 or the remote inside remote operator link 91 will cause undogging member 74 to rotate dog 65 into retracted position, so that when the bolt housing is manually forced rightward as shown in Fig. 1, the bolt 47 will ride over the projecting tooth on rotor 21 and will be forced downwardly into projected position again after it leaves the rotor. In this connection, it should be noted that the bolt will be immediately re-dogged when it returns to projected position. Should the vehicle operator release the door handle before bolt 47 leaves the rotor, the rounded end of bolt extension 69 will cam the toe 68 out of obstructing relation as it moves down, and the toe will ride over the extension and move into dogging position above it. Upon departure of the bolt from its contact with rotor 21 the latter will be left in the same position as previously described, ready for another closing operation. As described previously, operation of either door operator will also retract safety member 54, allowing the bolt housing to pass freely between the keeper housing 24 and the abutment 25.

Figs. 7 to 9 illustrate a modification of the invention which is generally similar in principle to the first embodiment, but which utilizes a rotary bolt mechanism generally indicated at 115 rather than a rotary keeper, the take-up principles being therefore embodied in the bolt rather than the keeper. The bolt cooperates with a keeper generally indicated at 116 which may be of a conventional stationary type, and which in the illustrated embodiment comprises a safety finger 117 pivotally mounted in the keeper housing, a striker surface 118 behind the safety finger, and an inclined main keeper surface 119 behind the striker surface. The bolt mechanism comprises a mounting plate having a base 121 and a flange 122 in substantially normal relation, with a bolt housing 123 and an inclined abutment 124 extending outwardly in spaced relation from the flange 121. The abutment 124 has an inclined lower surface 125 adapted to slide along the inclined upper surface 126 of the keeper when the door is closed, to thereby wedge the keeper between the abutment and rotary bolt 127, mounted near the upper end of the bolt housing. The rotor may be similar in design to that described in the keeper of the previous embodiment, and comprises a single set of teeth adapted to alternately project upwardly for engagement with the keeper, and to cooperate with the take-up roller 128. For this purpose the rotor is supported for rotational movement by a pivot pin 129 held between outer wall 131 of the bolt housing and a deck 132 extending in parallel relation with wall 131 within the upper portion of the bolt housing. The upper surface of the housing is provided with an elongated opening 133 which allows the rotor teeth to pass therethrough. The lower wall 134 of the housing is curved upwardly and to the left as shown in Fig. 7 to provide an inclined track similar in function to the track 38 of the previous embodiment.

In order to control the dogging and take-up action of roller 128, the latter is provided with a transversely extending pin 135 to which is connected one arm 136 of a retracting lever 137. This retracting lever is movably secured to base 121 by a pin 138 which is disposed within a slightly elongated slot 139 in the retracting lever. The positioning of slot 139 is such that movement of the retracting lever in the axial direction of arm 136 is permitted to a slight degree. Flange 122 is provided with an elongated slot 140 through which extends a rollback member 141. The rollback is slidably mounted directly behind base 121 by means of a pin and washer 142 disposed within an elongated slot 143 in the lower portion of the rollback. The rollback extends across the open inner side of bolt housing 123, and has an arcuate slot 144 within which extends the roller pin 135. A coil spring 145 is engageable with arm 136 of the retracting lever so as to urge the latter clockwise as shown in Fig. 7, thereby urging pin 135 against the left end of arcuate slot 144. This action in turn will urge the rollback 141 to the left, so that pin 142 will be disposed at the right end of slot 143. A guide 146 is provided on base 121 adjacent the opposite end of the rollback member to maintain its reciprocating movement.

It will be seen therefore that the spring 145 will normally urge roller 128 to the left end of track 134, and therefore into engagement with tooth 147 of the rotor 127. During this movement the upward curvature of track 134 will cause the roller to move upwardly against tooth 147 to urge the rotor into its counterclockwise or keeper-engaging position. This upward movement of the roller will not be restricted either by the retracting lever 137 or the rollback 141. The retracting lever will float with the roller because of its slightly elongated mounting hole 139, and rollback 141 will be allowed slight pivotal movement about pin 142 due to the play existing in guide 146. The roller will thus be allowed free take-up action in its engagement with the rotor 127, similar to the take-up action described with the relation to the previous embodiment. However, upon rightward movement of rollback 141 due to engagement with its flange 148 by outside door operator 149, the pin 135 and therefore the roller will be moved rightwardly and out of obstructing relation with the rotor, the length of slot 143 being such that sufficient retracting movement is allowed. Release of operator 149 will immediately allow spring 145 to return the roller to its dogging position. It will be noted that during operation of the roller by the rollback 141, the pin 135 will always remain at the left end of arcuate slot 144.

Means are provided for retracting roller 128 by a remote operator such as an inside door handle. For this purpose the retracting lever 137 is provided with an arm 151 which cooperates with one arm 152 of a bell crank 153 pivotally mounted on flange 122. The opposite arm 154 of the bell crank is adapted to be pivotally connected to a link 155 leading from a remote operator (not shown). Upon leftward movement of link 155 as seen in Fig. 8, the bell crank 153 will be rocked clockwise, rotating lever 137 counterclockwise as seen in Fig. 7. This movement will cause pin 135 and therefore roller 128 to move to the right end of arcuate slot 144 and out of obstructing relation with the rotor 127. It will be observed that during this action the roller will also be allowed relatively unrestricted movement as it follows track 134, due to the free-floating mounting of the lever 137 and the rollback 141.

Locking means are also provided in this modification for preventing movement of rollback 141. This locking means preferably comprises a locking lever 156 pivotally mounted on flange 122 in the same location as bell crank 153. A finger 157 on the locking lever extends through a slot 158 in flange 122 and is adapted to be moved in front of slot 140 so as to lie in obstructing relation with locking surface 159 of the rollback, thereby preventing undogging movement of the latter. This obstructing position of finger 157 occurs when the locking lever 156 is in its counterclockwise or locking position as shown in dot-dash lines in Fig. 8. However, when the locking lever is in its clockwise position shown by the full lines in Fig. 8, the finger 157 is lowered and moved leftward sufficiently to clear the undogging path of the rollback. The locking lever is preferably movable into its locking position by operation of the inside door handle in a direction opposite its normal door-opening direction, that is by rotation of bell crank 153 counterclockwise in Fig. 8. The inside door handle in this case could be one of the type which is biased to a neutral position and movable out of its neutral position in opposite directions. For this purpose, the locking lever is provided with a small bend 160 which extends laterally above the upper edge of arm 152 of the bell crank. It will be seen therefore that counterclockwise rotation of the bell crank will cause its upper edge to abut lip 160, moving the locking lever counterclockwise. The locking lever may also be moved into either of its positions by a forked lever 161 pivotally supported on flange 122 and adapted to have a lost-motion connection with an arm 162 on the locking lever. Forked member 161 may be actuated by a key mechanism (not shown), and the locking lever is held in either of its positions by an over-center spring 163 connected to an arm 164 on the locking lever. It will be noted that even when the locking lever is in its locking position, retraction of the roller 128 by the remote operator will still be permitted, since the rotational movement of retracting lever 137 will not be prevented.

Means are also provided for automatically unlocking the outside rollback either when the inside remote operator is actuated to unlatch the bolt, or when the door is closed. This means comprises a kick-off toe 165 on the locking lever disposed immediately under arm 151 of the retracting lever, as shown in Fig. 8. Upon counterclockwise rotational movement of the retracting lever as seen in Fig. 7, either due to actuation of the inside operator or by clockwise rotation of rotor 127 due to closing of the door, arm 151 will engage toe 165, thus rotating the locking lever into its unlocking position, in which position it will be held by over-center spring 163.

The cooperation of the various elements described in the embodiment of Figs. 7 to 9 may perhaps best be illustrated by a description of the sequence of events which occur during a normal closing and opening of the door. Starting from an initial condition in which the door is open, the bolt mechanism will be in a position substantially shown in Fig. 7, the roller 128 however being urged fully to the left so as to engage tooth 147 above it and tooth 166 to its left. Upon movement of the bolt mechanism to the right, safety member 117 of the keeper will first engage the upwardly projecting tooth on the rotor and will be retracted until it passes over the tooth and falls into position behind it. This will prevent subsequent opening movement of the door, since the dogging position of roller 128 under tooth 147 will prevent clockwise rotation of the rotor. Further rightward movement of the bolt mechanism will cause lower abutment surface 125 to ride up on keeper surface 126, and will further cause striker surface 118 to engage the upwardly projecting tooth 127. The subsequent counterclockwise force on the rotor will cause roller 128 to be moved rightward against the action of spring 145, undogging lever 137 rocking counterclockwise at the same time. During this movement, pin 135 will move within arcuate slot 144 on the rollback, the latter remaining stationary. When tooth 166 passes the center-line of roller 128, the latter will be forced leftwardly by spring 145 under the tooth, which then becomes tooth 147. The subsequent rapid counterclockwise rotation of the rotor will terminate when the next upwardly projecting tooth abuts keeper surface 119. From then on, the take-up action of roller 128 will be similar to that described for the previous embodiment, any jarring or vibration serving to wedge the roller further under tooth 147 to thereby rotate the rotor further counterclockwise.

When it is desired to open the door, the roller 128 will be moved rightwardly either by the rollback 141 or by the retracting lever 137 operated by the inside door handle, the retraction of the roller allowing the rotor 127 to rotate freely. The bolt mechanism may then be moved leftwardly, the rotor spinning clockwise as it allows first the keeper surface 119 and then the safety member 117 to pass thereover.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a latching mechanism having relatively movable bolt and keeper elements, a rotary member comprising one of said elements, said rotary member having a latching surface engageable with said other element when rotated in a latching direction, and means for dogging said rotary member against rotation in an unlatching direction, said means comprising an inclined track adjacent said rotary member, and a roller movably positioned on said track, said roller being adapted to wedgingly engage said rotary member when the roller is moved in one direction along said track, to thereby urge said rotary member in its latching direction, the surfaces of engagement of said roller and rotary member being so inclined relative to said track as to prevent unlatching movement of said rotary member.

2. In a latching mechanism of the type having relatively movable bolt and keeper elements, a multi-toothed rotor forming one of said elements and adapted to project a tooth into the path of movement of the other of said elements, combined dogging and take-up means for said rotor, said means comprising a track adjacent said rotor, said track being inclined relative to one surface of one of said teeth when the rotor is in latching position, a roller movable on said track between a retracted and a dogging position, said roller being retractable by said one tooth when the rotor is rotated by the advance of said other element into latching position, and resilient means engageable with said roller and urging it behind said tooth after the latter has passed the roller, whereby said roller will engage the back of said tooth to impose a take-up force on said rotor in its latching direction, the surfaces of engagement of said roller and rotary member being so inclined relative to said track as to prevent unlatching movement of said rotary member.

3. In a latching mechanism having relatively movable bolt and keeper elements, a multi-toothed rotor forming said bolt element, said rotor being rotatable by said keeper during closing movement of the elements, a tooth of said rotor being engageable with said keeper after closing movement to prevent unlatching, a housing partially enclosing said rotor, dogging means within said housing for preventing unlatching movement of said rotor, said dogging means comprising a track inclined relative to one surface of one of the teeth of said rotor, a roller movable on said track between a dogging and an undogging position, said roller when in its dogging position being at a portion of said track closer to said surface, resilient means urging said roller into its dogging position to thereby cause further latching movement of said rotor, and retracting means for moving said roller into its undogging position, the surfaces of engagement of said roller and rotary member being so inclined relative to said track as to prevent unlatching movement of said rotary member.

4. In a latching mechanism having relatively movable bolt and keeper elements, a multi-toothed rotor forming said bolt element, said rotor being rotatable by said keeper during closing movement of the elements, a tooth of said rotor being engageable with said keeper after closing movement to prevent unlatching, dogging means for preventing unlatching movement of said rotor, said dogging means comprising a track adjacent said rotor, said track being inclined relative to a portion of the surface of one of said teeth when the rotor is in latching engagement with the bolt, a roller element movable along said track, and resilient means urging said roller toward the portion of said track closest to said tooth surface, rotation of said rotor during closing movement of said bolt forcing said roller toward the opposite end of said track, said resilient means urging said roller toward its initial position when said rotor is in latching position, whereby said roller will engage said tooth surface portion to cause take-up movement of said rotor in its latching direction, the surfaces of engagement of said roller and rotary member being so inclined relative to said track as to prevent unlatching movement of said rotary member.

5. In a latch mechanism having relatively movable bolt and keeper elements, a multi-toothed rotor forming said bolt element, said rotor being adapted to engage said keeper with a single tooth when in latching position, dogging means engageable with another tooth on said rotor to prevent unlatching movement, said dogging means comprising a track inclined relative to a surface portion of said last-mentioned tooth, a roller movable on said track, resilient means urging said roller toward the portion of said track closest to said tooth surface portion whereby said roller will wedgingly engage said tooth to urge the rotor further in a latching direction, a retracting lever connected to said roller for moving the latter away from its dogging position, and a pin-and-slot connection for supporting said retracting lever, said connection allowing pivotal and translatory movement of said retracting lever during movement of said roller along said track.

6. In a latch mechanism having relatively movable bolt and keeper elements, a multi-toothed rotor forming said bolt element, said rotor being adapted to engage said keeper with a single tooth when in latching position, dogging means engageable with another tooth on said rotor to prevent unlatching movement, said dogging means comprising a track inclined relative to a surface portion of said last-mentioned tooth, a roller movable on said track, resilient means urging said roller toward the portion of said track closest to said tooth whereby said roller will wedgingly engage said tooth surface portion to urge the rotor further in a latching direction, a rollback member slidably mounted adjacent said roller and engageable with a portion thereof, said rollback being movable between a retracting position and a dogging position, and supporting means for said rollback allowing pivotal movement thereof during the movement of said roller along said track.

7. In a latch mechanism having relatively movable bolt and keeper elements, a multi-toothed rotor forming said bolt element, said rotor being adapted to engage said keeper with a single tooth when in latching position, dogging means engageable with another tooth on said rotor to prevent unlatching movement, said dogging means comprising a track inclined relative to a surface portion of said last-mentioned tooth, a roller movable on said track, resilient means urging said roller toward the portion of said track closest to said tooth surface portion whereby said roller will wedgingly engage said tooth to urge the rotor further in a latching direction, a rollback mounted adjacent said roller, said roller having a lost-motion connection with said rollback, the rollback being movable between an undogging position retracting said roller from said rotor and a dogging position allowing said roller to dog said rotor, and a retracting lever mounted adjacent said roller and connected thereto, said retracting lever being adapted to move said roller between its dogging and undogging positions independently of said rollback.

8. The combination according to claim 7, said resilient means comprising a spring engageable with said retracting lever, whereby said spring serves to normally hold said rollback in its dogging position.

9. The combination according to claim 7, said lost-motion connection comprising an arcuate slot in said rollback, said roller having a pin extending through said slot and normally urged against one end thereof by said resilient means, said retracting lever being connected to said pin, whereby the retracting lever is adapted to move said pin along said slot.

10. In a latch mechanism having relatively movable bolt and keeper elements, a multi-toothed rotor forming said bolt element, said rotor being adapted to engage said keeper with a single tooth when in latching position, dogging means engageable with another tooth on said rotor to prevent unlatching movement, said dogging means comprising a track inclined relative to a surface portion of said last-mentioned tooth, a roller movable on said track, resilient means urging said roller toward the portion of said track closest to said tooth surface portion whereby said roller will wedgingly engage said tooth to urge the rotor further in a latching direction, the surfaces of engagement of said roller and rotary member being so inclined relative to said track as to prevent unlatching movement of said rotary member, a rollback mounted adjacent said roller, said rollback being movable between an undogging position retracting said roller from said rotor and a dogging position allowing said roller to dog said rotor, and locking means for preventing movement of said rollback into its undogging position, said locking means comprising a lever movable between locking and unlocking positions, said lever when in its locking position having a portion in obstructing relation with said rollback.

11. In combination, a bolt mechanism having a retractable bolt member, said member having a keeper-retracting surface and a latching surface, a keeper including a multi-toothed rotor, one tooth on said rotor being engageable by the keeper-retracting surface of said bolt when the bolt is moved in a latching direction, bolt latching means normally preventing retraction of said bolt and releasable to allow such retraction when the bolt mechanism is moved in an unlatching direction, dogging means for holding said rotor in engagement with the latching surface of said bolt, said dogging means comprising a track inclined relative to a portion of the surface of one of said rotor teeth when the rotor is in latching position, a wedging member movable on said inclined track between a dogging and an undogging position, said wedging member when in its dogging position being at the portion of said track which is closer to said tooth surface portion, an abutment in spaced relation with said rotor, said bolt mechanism being further provided with a safety member engageable with said abutment, undogging means for said bolt, and retracting means for said safety member engageable by a portion of said bolt undogging means to simultaneously retract said safety member.

12. In a latch mechanism having relatively movable bolt and keeper elements, a multi-toothed rotor forming said keeper element, a housing partially enclosing said rotor, said housing having an opening for permitting single teeth to progressively project from said housing into latching engagement with said bolt, dogging means for preventing movement of said rotor in an unlatching direction, said dogging means comprising a track in said housing and inclined relative to a portion of the surface of one of said teeth when the rotor is in latching position, a roller movable on said track, resilient means engageable with said roller to urge the latter toward the portion of said track closer to said tooth surface to cam said roller in its latching position, said roller in its dogging position being in the path of movement of the advancing teeth of said rotor when rotated in a latching direction, whereby said roller is adapted to be forced into retracted position against the action of said resilient means.

13. In a latch mechanism having relatively movable bolt and keeper elements, a multi-toothed rotor forming said bolt element, said rotor being adapted to engage said keeper with a single tooth when in latching position, dogging means engageable with another tooth on said rotor to prevent unlatching movement, said dogging means comprising a track inclined relative to a surface portion of said last-mentioned tooth, a roller movable on said track, resilient means urging said roller toward the portion of said track closest to said tooth surface portion whereby said roller will wedgingly engage said tooth to urge the rotor further in a latching direction, a rollback mounted adjacent said roller, said rollback being movable between an undogging position retracting said roller to dog said rotor and a dogging position allowing said roller to dog said rotor, locking means for preventing movement of said rollback into its undogging position, said locking means comprising a lever movable between locking and unlocking positions, said lever when in its locking position having a portion in obstructing relation with said rollback, and a retracting lever connected to said roller and adapted to move said roller into its retracted position independently of said rollback, a portion of said retracting lever being engageable with said locking lever during its retracting movement, whereby said locking lever is moved from its locking to its unlocking position.

14. The combination according to claim 13, further provided with a second rollback member movable in one direction to retract said roller independently of said first rollback, said second rollback member being engageable with said locking lever when moved in the opposite direction to move the locking lever into its locking position.

15. In a latching mechanism having relatively movable bolt and keeper elements, a toothed rotor forming said keeper, a retractable bolt engageable with said rotor, said bolt being adapted to rotate said rotor in a latching direction during closing movement and be engaged by a tooth of said rotor when the bolt has reached latching position, bolt dogging means to prevent retracting movement of said bolt, dogging means to prevent movement of said rotor in a direction opposite to its latching movement when the rotor has reached latching position, said last-named dogging means comprising a cam surface adjacent said rotor, a wedging element movable on said cam surface between a dogging and an undogging position, a surface on each tooth of said rotor engageable with said wedging element to move the latter to its undogging position when said rotor is being rotated in its latching direction by said bolt, resilient means urging said wedging element toward its dogging position, and a second surface on each tooth of said rotor engageable by said wedging element when moved toward its dogging position after it has passed the apex of the tooth to force said rotor in its latching direction.

References Cited in the file of this patent

UNITED STATES PATENTS

| | | |
|---|---|---|
| 1,676,515 | Anstey | July 10, 1928 |
| 2,167,391 | Marple | July 25, 1939 |
| 2,270,559 | Rolph et al. | Jan. 20, 1942 |
| 2,301,559 | Marple | Nov. 10, 1942 |
| 2,347,146 | Baker | Apr. 18, 1944 |
| 2,362,255 | Endter | Nov. 7, 1944 |
| 2,362,256 | Endter | Nov. 7, 1944 |
| 2,494,754 | Goughnour | Jan. 17, 1950 |
| 2,499,111 | Roethel | Feb. 28, 1950 |
| 2,557,468 | Roethel | June 19, 1951 |
| 2,569,046 | Endter | Sept. 25, 1951 |